(12) United States Patent
Gonthier et al.

(10) Patent No.: US 8,085,464 B2
(45) Date of Patent: Dec. 27, 2011

(54) MULTI-CLAD OPTICAL FIBRE AMPLIFIER WITH OPTIMIZED PUMPING

(75) Inventors: François Gonthier, Quebec (CA); Alain Villeneuve, Mount-Royal (CA)

(73) Assignee: Genia Photonics Inc., Laval (CA)

( * ) Notice: Subject to any disclaimer, the term of this patent is extended or adjusted under 35 U.S.C. 154(b) by 546 days.

(21) Appl. No.: 12/081,615

(22) Filed: Apr. 18, 2008

(65) Prior Publication Data
US 2009/0231684 A1    Sep. 17, 2009

Related U.S. Application Data

(60) Provisional application No. 60/907,831, filed on Apr. 18, 2007.

(51) Int. Cl.
*H04B 10/17* (2006.01)
(52) U.S. Cl. .................................. 359/341.3; 359/341.1
(58) Field of Classification Search ................ 359/341.1, 359/341.3
See application file for complete search history.

(56) References Cited

U.S. PATENT DOCUMENTS

| | | | |
|---|---|---|---|
| 4,941,726 A | 7/1990 | Russell et al. | |
| 5,117,303 A | 5/1992 | Desurvire et al. | |
| 5,768,012 A * | 6/1998 | Zanoni et al. | 359/341.5 |
| 5,867,305 A * | 2/1999 | Waarts et al. | 359/337.12 |
| 5,930,030 A * | 7/1999 | Scifres | 359/341.3 |
| 5,933,271 A * | 8/1999 | Waarts et al. | 359/341.31 |
| 6,081,369 A * | 6/2000 | Waarts et al. | 359/341.33 |
| 6,282,016 B1 | 8/2001 | MacCormack et al. | |
| 6,317,537 B1 * | 11/2001 | Ionov et al. | 385/32 |
| 6,324,326 B1 * | 11/2001 | Dejneka et al. | 385/123 |
| 6,434,302 B1 * | 8/2002 | Fidric et al. | 385/43 |
| 6,603,596 B2 * | 8/2003 | Inagaki et al. | 359/341.4 |
| 6,721,481 B2 | 4/2004 | Terahara et al. | |
| 6,731,837 B2 | 5/2004 | Goldberg et al. | |
| 6,801,550 B1 * | 10/2004 | Snell et al. | 372/6 |
| 2002/0071173 A1 * | 6/2002 | Lee et al. | 359/337.1 |
| 2002/0094159 A1 * | 7/2002 | Goldberg et al. | 385/27 |
| 2002/0122243 A1 | 9/2002 | Abushagur | |
| 2004/0196537 A1 | 10/2004 | Starodoumov | |
| 2005/0105854 A1 * | 5/2005 | Dong et al. | 385/46 |
| 2006/0187534 A1 | 8/2006 | Hodder et al. | |

FOREIGN PATENT DOCUMENTS
WO    WO 2005/112206 A1    11/2005

* cited by examiner

*Primary Examiner* — Eric Bolda

(57) ABSTRACT

An optical amplifier for amplifying an optical signal (1002), the optical amplifier comprising: an optical fibre, the optical fibre including a doped core, an inner cladding extending substantially radially outwardly from the doped core and an outer cladding extending substantially radially outwardly from the inner cladding; a signal coupler for receiving the optical signal and guiding the optical signal into the doped core; a first pump light source for producing a first pump light having a first power, the first pump light source being optically coupled to the optical fibre at a first location therealong for guiding the first pump light into the inner cladding at the first location; and a second pump light source for producing a second pump light having a second power, the second power being larger than the first power, the second pump light source being optically coupled to the optical fibre at a second location therealong for guiding the second pump light into the inner cladding at the second location; wherein the first location is located between the signal coupler and the second location.

21 Claims, 12 Drawing Sheets

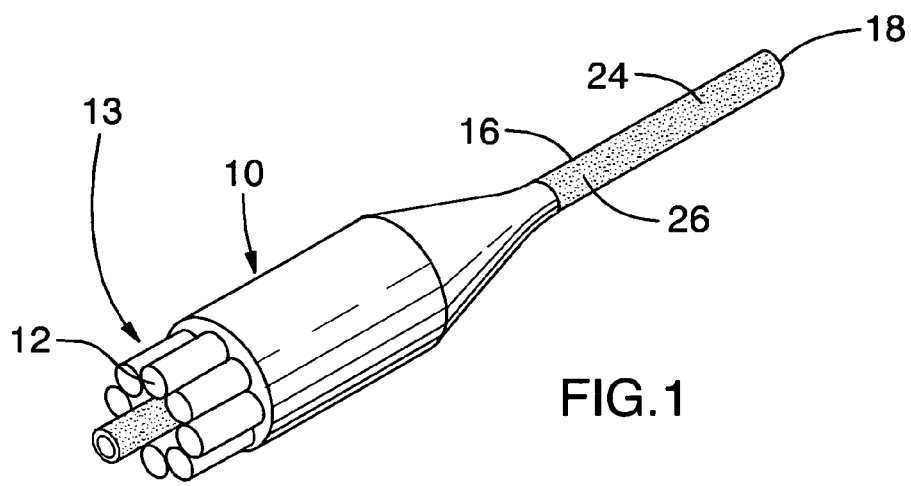
FIG.1
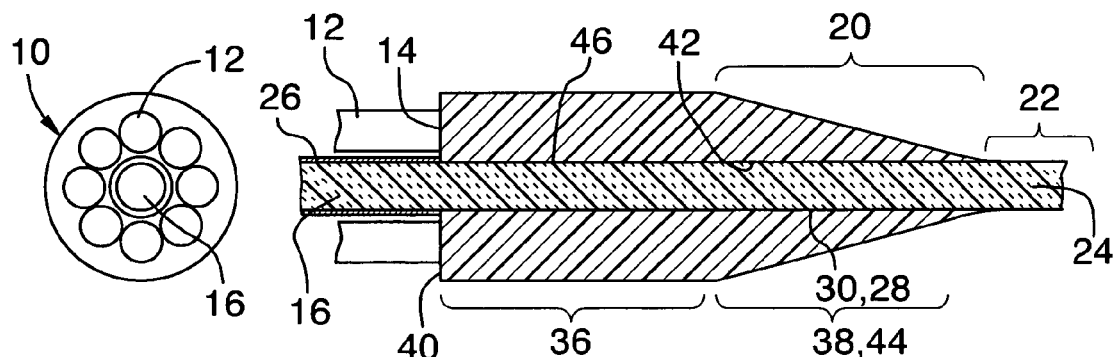
FIG.2
FIG.3
FIG.4

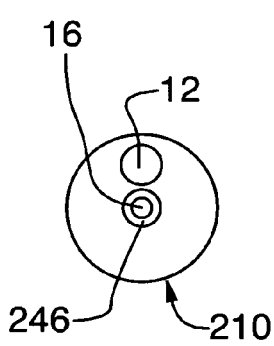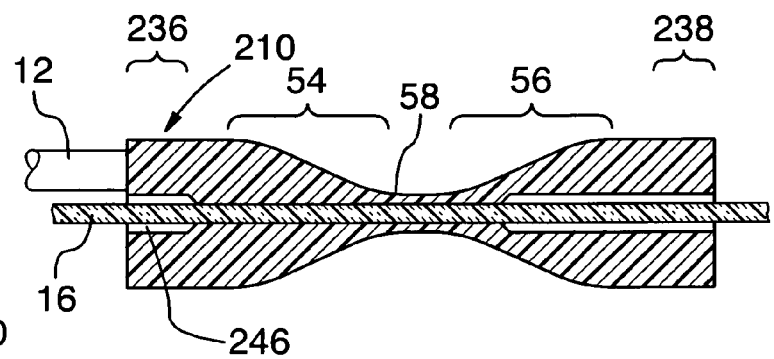
FIG.9      FIG.8A
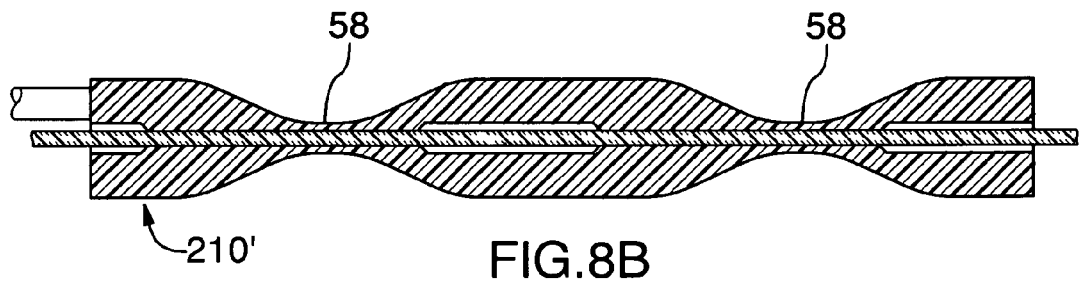
FIG.8B
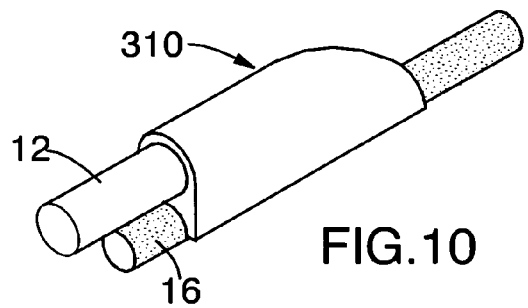
FIG.10
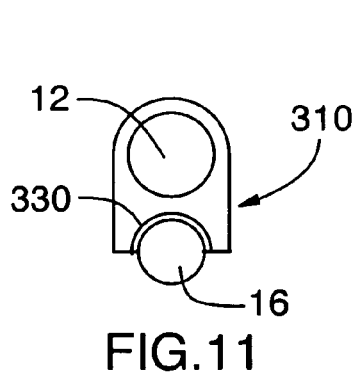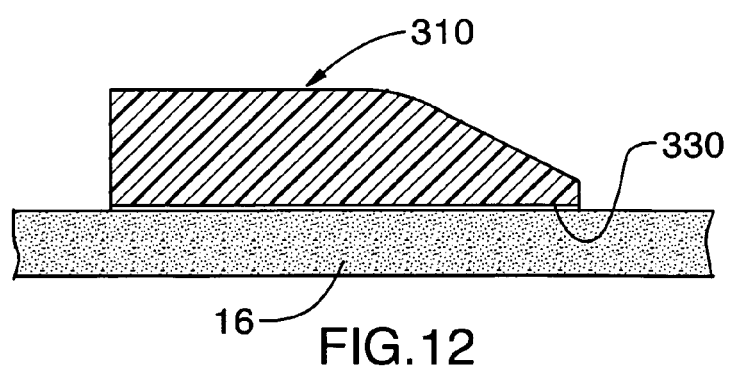
FIG.11      FIG.12

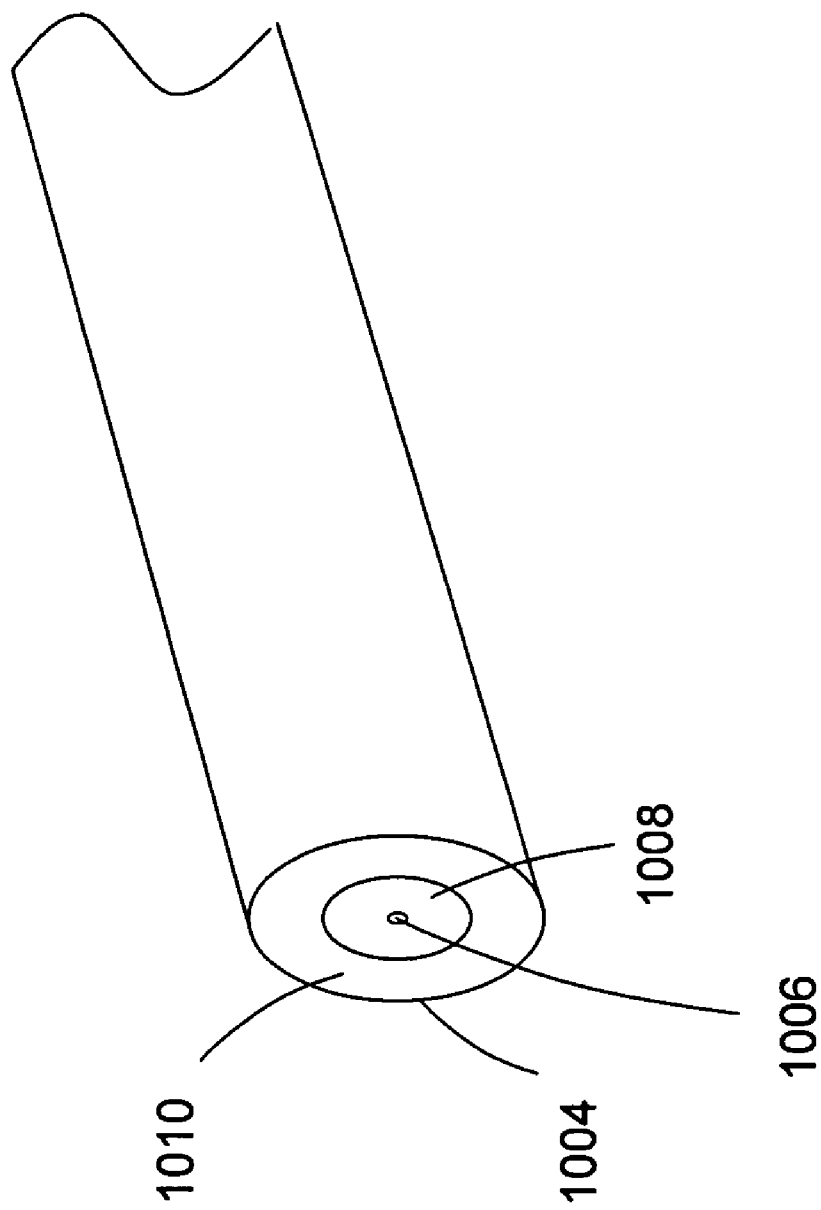

MULTI-CLAD OPTICAL FIBRE AMPLIFIER WITH OPTIMIZED PUMPING

The present application claims priority from U.S. Provisional Patent Application Ser. No. 60/907,831 filed on Apr. 18, 2007.

FIELD OF THE INVENTION

The present invention relates to the general field of optical fibres, and is particularly concerned with an optical fibre amplifier and a method of assembling same.

BACKGROUND OF THE INVENTION

Optical amplifiers, and more specifically optical fibre amplifiers, are used in many applications. Such amplifiers use a gain medium into which a pump light is guided to amplify a signal guided within the gain medium. However, these amplifiers typically have numerous drawbacks. For example, it is relatively difficult to achieve large gains in such amplifiers as there are typically problems caused by the amplification of spontaneous light emission and saturation of the amplifying medium at large gains.

These problems are usually circumvented in prior art devices by concatenating many optical amplifiers having a relatively small amplification gain. However, there is typically a need to separate the various amplifier stages by many optical components such as optical isolators and optical filters to prevent the build-up of amplified scattering noise in the amplifier and back propagation of potentially damaging light. In turn, this causes these conventional optical fibre amplifiers to be relatively complex and relatively costly. In addition, the use of many components increases losses in signal power as even good quality components typically all have non-negligible power losses. Furthermore, there is typically a need to have relatively long optical fibres in each amplification state so that the light pumped in each stage is mostly absorbed before reaching the following further stage.

Many inventors have tried to improve on the basic design described hereinabove, but all these improved designs still have drawbacks. For example, PCT Application 2005/112206 published Nov. 24, 2005 and applied for by Sintov describes an optical amplifier made out of a doped optical fibre in which pump light is injected at many longitudinally spaced apart locations. Sintov explicitly mentions that a drawback or, at least, a characteristic of his amplifier is that there is a need for near complete absorption of light between injection points. In addition, in this amplifier, power is injected at similar levels at all locations. Therefore, achieving a large gain in this amplifier still requires that the amplifier be relatively large and, therefore, relatively costly to build.

In another example, U.S. Pat. No. 5,933,271 published Aug. 3, 1999 and issued to Waarts et al. describes an optical fibre in which pump light is injected in counter-propagating direction from both ends of the optical fibre. Once again, in this patent, the amplifier requires that the optical fibre be long enough so that most of the pump light injected at one end is absorbed before it reaches the other end. More specifically, Waarts even suggests that there is a need for most of the pump light to be absorbed before half of the fibre length. Also, while this patent shows how to increase gain in an optical amplifier by injecting light at two ends thereof, there is no manner in which pump power could be further increased, as optical fibres are essentially one-dimensional objects for this purpose as they only have two ends.

Against this background, there exists a need in the industry to provide an improved optical amplifier. An object of the present invention is therefore to provide such an optical amplifier and methods of assembling same.

SUMMARY OF THE INVENTION

In a broad aspect, the invention provides an optical amplifier for amplifying an optical signal, the optical amplifier comprising:
an optical fibre, the optical fibre including a doped core, an inner cladding extending substantially radially outwardly from the doped core and an outer cladding extending substantially radially outwardly from the inner cladding;
a signal coupler for receiving the optical signal and guiding the optical signal into the doped core;
a first pump light source for producing a first pump light having a first power, the first pump light source being optically coupled to the optical fibre at a first location therealong for guiding the first pump light into the inner cladding at the first location; and
a second pump light source for producing a second pump light having a second power, the second power being larger than the first power, the second pump light source being optically coupled to the optical fibre at a second location therealong for guiding the second pump light into the inner cladding at the second location;
wherein the first location is located between the signal coupler and the second location.

Advantageously, in some embodiments of the invention, the first and second pump lights amplify the optical signal so as to simultaneously increase a total amplification gain achievable by the optical amplifier and a signal to noise ratio characteristic of the optical amplifier.

In another broad aspect, the invention provides an optical assembly, the optical assembly being usable with an optical signal source producing an optical signal, a first pump light source producing a first pump light and a second pump light source producing a second pump light, the optical assembly comprising:
an optical fibre, the optical fibre including a doped core, an inner cladding extending substantially radially outwardly from the doped core and an outer cladding extending substantially radially outwardly from the inner cladding;
a signal coupler for optically coupling the signal light source to the doped core;
a first pump coupler for optically coupling the first pump light source with the optical fibre so as to guide the first pump light into the inner cladding, the first coupler having a first coupler numerical aperture;
a second pump coupler for optically coupling the second pump light source with the optical fibre so as to guide the second pump light into the inner cladding, the second coupler having a second coupler numerical aperture;
wherein
the first pump coupler is located between the signal coupler and the second pump coupler; and
the second coupler numerical aperture is larger than the first coupler numerical aperture;
whereby having the second coupler numerical aperture larger than the first coupler numerical aperture allows for the optical coupling of the second pump light into the optical fibre at a location at which the first pump light guided into the optical fibre by the first pump coupler has only been partially absorbed by the doped core.

In yet another broad aspect, the invention provides a method for amplifying an optical signal in a double-clad doped optical fibre having a doped core, an inner cladding extending substantially radially outwardly from the doped core and an outer cladding extending substantially radially outwardly from the inner cladding, the method comprising:

guiding the optical signal into the core;

guiding a first pump light having a first pump power into the inner cladding at a first location along the optical fibre;

guiding a second pump light having a second pump power into the inner cladding at a second location along the optical fibre, the second pump power being larger than the first pump power;

whereby the first and second pump lights amplify the optical signal so as to simultaneously increase a total amplification gain achievable by the optical amplifier and a signal to noise ratio characteristic of the optical amplifier.

In yet another broad aspect, the invention provides a method of assembling an optical amplifier, the method comprising providing a doped core optical fibre;

coupling a first source of pump light to the optical fibre at a first location therealong; and coupling a second source of pump light to the optical fibre at a second location therealong, the second location being spaced apart from the first location.

In yet another broad aspect, the invention provides an optical amplifier for amplifying an optical signal, the optical amplifier comprising:

an optical fibre, the optical fibre having light amplification capabilities for amplifying the optical signal when illuminated by pump light;

a signal coupler for receiving the optical signal and guiding the optical signal into the optical fibre;

a first pump light source for producing a first pump light having a first power, the first pump light source being optically coupled to the optical fibre at a first location therealong for guiding the first pump light into the optical fibre at the first location; and a second pump light source for producing a second pump light having a second power, the second power being larger than the first power, the second pump light source being optically coupled to the optical fibre at a second location therealong for guiding the second pump light into the optical fibre at the second location;

wherein the first location is located between the signal coupler and the second location;

whereby the first and second pump lights amplify the optical signal so as to simultaneously increase a total amplification gain achievable by the optical amplifier and a signal to noise ratio characteristic of the optical amplifier.

In yet another broad aspect, the invention provides an optical amplifier for amplifying an optical signal, the optical amplifier comprising:

an optical fibre, the optical fibre including a doped core, an inner cladding extending substantially radially outwardly from the doped core and an outer cladding extending substantially radially outwardly from the inner cladding;

a signal coupler for receiving the optical signal and guiding the optical signal into the doped core;

a first pump light source for producing a first pump light having a first power, the first pump light source being optically coupled to the optical fibre at a first location therealong for guiding the first pump light into the inner cladding at the first location, the first location being downstream relatively to the signal coupler; and a second pump light source for producing a second pump light having a second power, the second power being larger than the first power, the second pump light source being optically coupled to the optical fibre at a second location therealong for guiding the second pump light into the inner cladding at the second location, the second location being downstream relatively to the first location;

whereby the first and second pump lights amplify the optical signal so as to simultaneously increase a total amplification gain achievable by the optical amplifier and a signal to noise ratio characteristic of the optical amplifier.

Advantageously, the proposed optical amplifier allows for the obtention of relatively large gains in relatively compact arrangements. In addition, the proposed optical amplifier is relatively easily manufacturable at relatively low costs.

In addition, in some embodiments of the invention, the proposed amplifier has relatively large signal-to-noise ratio and allows achieving relatively large gains in a single device. Yet furthermore, the proposed amplifier allows for the optimization of its operational characteristics, such as its signal to noise ratio, either by using predetermined pump powers or by adjusting the pump powers using feedback loops.

The reader skilled in the art will readily appreciate that in some embodiments of the invention, more than two optical couplers are usable to form a corresponding number of amplification stage coupling pump power in the optical fibre.

Also, in some embodiments of the invention, a multi-clad fibre, such as for example a triple-clad fibre is used. In these embodiments, the optical couplers may each inject light in a corresponding cladding so as to minimize power losses in these couplers.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 1, in a perspective view, illustrates an optical coupler in accordance with an embodiment of the invention optically coupled to two optical fibres;

FIG. 2, in a rear plan view, illustrates the optical coupler shown in FIG. 1;

FIG. 3, in a side cross-sectional view, illustrates the optical coupler shown in FIGS. 1 and 2;

FIG. 4, in a side cross-sectional view, illustrates an optical coupler in accordance with an alternative embodiment of the present invention optically coupled to two optical fibres;

FIG. 8A, in a side cross-sectional view, illustrates an optical coupler in accordance with yet another alternative embodiment of the present invention optically coupled to two optical fibres;

FIG. 8B, in a side cross-sectional view, illustrates an optical coupler in accordance with yet another alternative embodiment of the present invention optically coupled to two optical fibres;

FIG. 9, in a rear elevation view, illustrates the optical coupler shown in FIG. 8;

FIG. 10, in a perspective view, illustrates an optical coupler in accordance with yet another embodiment of the invention optically coupled to two optical fibres;

FIG. 11, in a rear plan view, illustrates the optical coupler shown in FIG. 10;

FIG. 12, in a side cross-sectional view, illustrates the optical coupler shown in FIGS. 10 and 11;

FIG. 30, in a perspective view, illustrates an optical fibre usable in the optical amplifiers shown in FIGS. 27 and 28.

DETAILED DESCRIPTION

Figure 27:
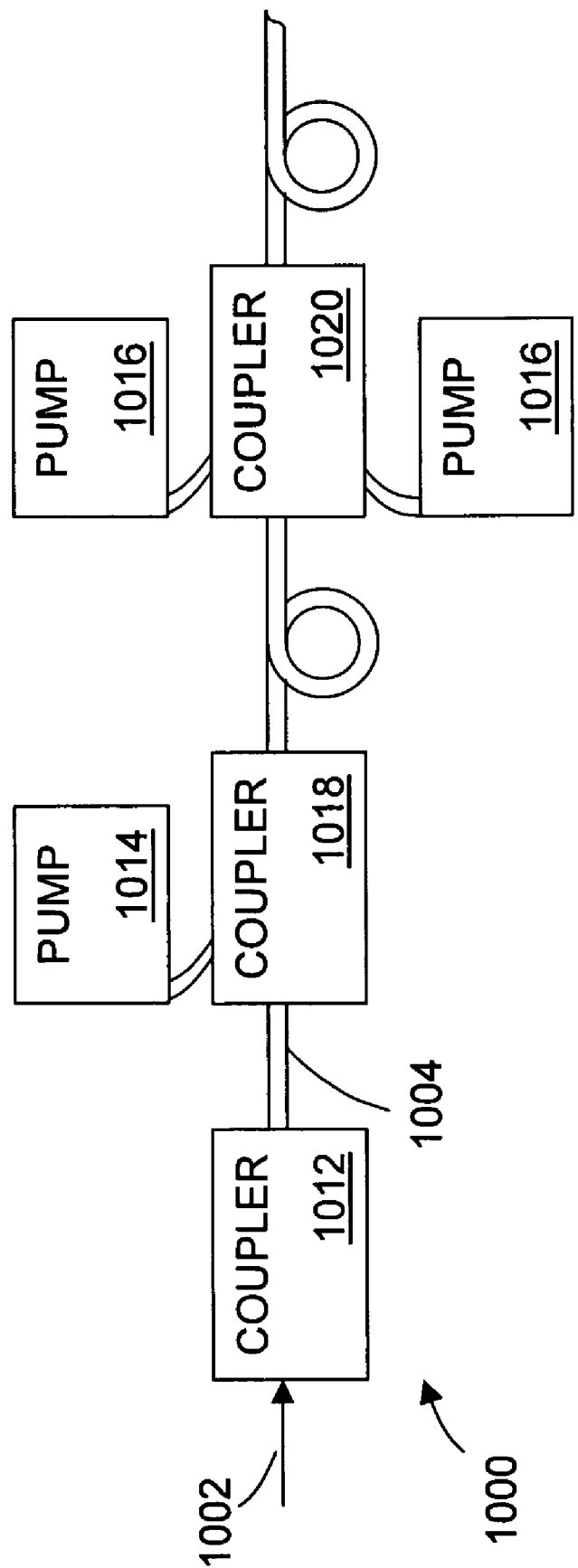
FIG. 27, in a schematic view, illustrates an optical amplifier in accordance with an embodiment of the present invention.

FIG. 27 illustrates an optical amplifier 1000 for amplifying an optical signal 1002 in accordance with an embodiment of the present invention. The optical amplifier 1000 includes an optical fibre 1004. For example, the optical fibre 1004, shown in more details in FIG. 30 with any coating or sheath stripped therefrom, includes a doped core 1006, an inner cladding 1008 extending substantially radially outwardly from the doped core 1006 and an outer cladding 1010 extending substantially radially outwardly from the inner cladding 1008. However, in alternative embodiments of the invention, the optical fibre 1004 is any other suitable optical fibre capable of amplifying an optical signal using pump light.

The optical amplifier 1000 includes a signal coupler 1012 for receiving the optical signal 1002 and guiding the optical signal 1002 into the doped core 1006. Also, the optical amplifier 1000 includes a first pump light source 1014 for producing a first pump light having a first power and a second pump light source 1016 for producing a second pump light having a second power. The second power is larger than the first power.

In alternative embodiments of the invention, more than two optical couplers are usable. Each optical coupler is usable to inject pump light having a higher power than upstream located optical couplers.

It should be noted that the term "light source" for the purpose of this document includes any source of light producing light that may interact with the doped core 1006 of the optical fibre 1004 to amplify a signal 1002 propagating thereinto. Therefore, as shown in FIG. 27, the second pump light source 1016 may include two or more physically distinct sources of light such as, for example, high power light emitting diodes, among other possibilities. In addition, it is within the scope of the invention to have a first and a second pump light sources 1014 and 1016 for which the light is produced by a single physical light source that is split into two or more portions for injection at different locations along the optical fibre 1004. In other words, for the purpose of the present invention, it suffices that the first and second pump light sources 1014 and 1016 provide light that has two different powers and that may be physically guided into the optical fibre 1004 at two different locations.

Also, the term "signal coupler" is to be interpreted broadly and includes any device usable to inject an optical signal in the doped core 1006. For example, in some embodiments, the signal coupler 1012 includes simply an interface between the optical fibre 1004 and another optical fibre fused or spliced with the optical fibre 1004. However, in other embodiments, the signal coupler 1012 includes more complex structure, such as for example lenses or other components.

The first pump light source 1014 is optically coupled to the optical fibre 1004 at a first location therealong for guiding the first pump light into the inner cladding 1008 of the optical fibre 1004 at the first location. This may be achieved, for example, by the use of an optical coupler 1018, which will be described in further details hereinbelow. Similarly, the second pump light source 1016 is optically coupled to the optical fibre 1004 at the second location therealong for guiding the second pump light into the inner cladding 1008 at the second location. Once again, this may be achieved, for example, by the use of an optical coupler 1020.

As shown in FIG. 27, the first location is located between the signal coupler 1012 and the second location. In other words, the first location is downstream relatively to the signal coupler 1012 while the second location is downstream relatively to the first location, the term "downstream" relating to the direction of propagation of the signal 1002 in the optical fibre 1004. Having the first and second pump lights injected into the optical fibre 1004 as described hereinabove allows to amplify the optical signal 1002 so as to simultaneously increase a total amplification gain achievable by the optical amplifier 1000 and also increase a signal-to-noise ratio characteristic of the optical amplifier 1000. In some embodiments of the invention, this is achieved by having the first and second pump lights amplifying the optical signal sequentially.

In some embodiments of the invention, the optical signal 1002, the first pump light and the second pump light propagate substantially in the same direction in the optical fibre 1004. However, in alternative embodiments of the invention, the first and second pump lights propagate in opposite direction in the optical amplifier 1000.

In some embodiments of the invention, the first and second powers are such that the combined amplified spontaneous emission noise produced by the first and second pump light in the optical fibre 1004 is substantially minimal. For example, it has been found that having an optical amplifier 1000 in which a gain of from about 3 dB to about 10 dB between the first and second locations produces good results that minimize amplification medium saturation while also minimizing the noise introduced in the optical signal 1002 during the amplification.

An advantage of the present invention is that, in some embodiments, the optical fibre 1004 extends uninterrupted between the first and second locations. In other words, there is no need in these embodiments to provide optical filters and other components to eliminate completely the first pump light before it reaches the second location.

In some embodiments of the invention, this is made possible by combining the use of optical fibres in which high numerical aperture modes are absorbed over a smaller distance than low numerical aperture modes and the use of optical couplers 1018 and 1020 having optical properties such that a numerical aperture of the second optical coupler 1020 is larger than the numerical aperture of the first optical coupler 1018. In these embodiments, it is possible to have the first and second locations distanced by a distance such that the first pump power is only partially absorbed by the doped core 1006 between the first and second locations.

Figure 29:
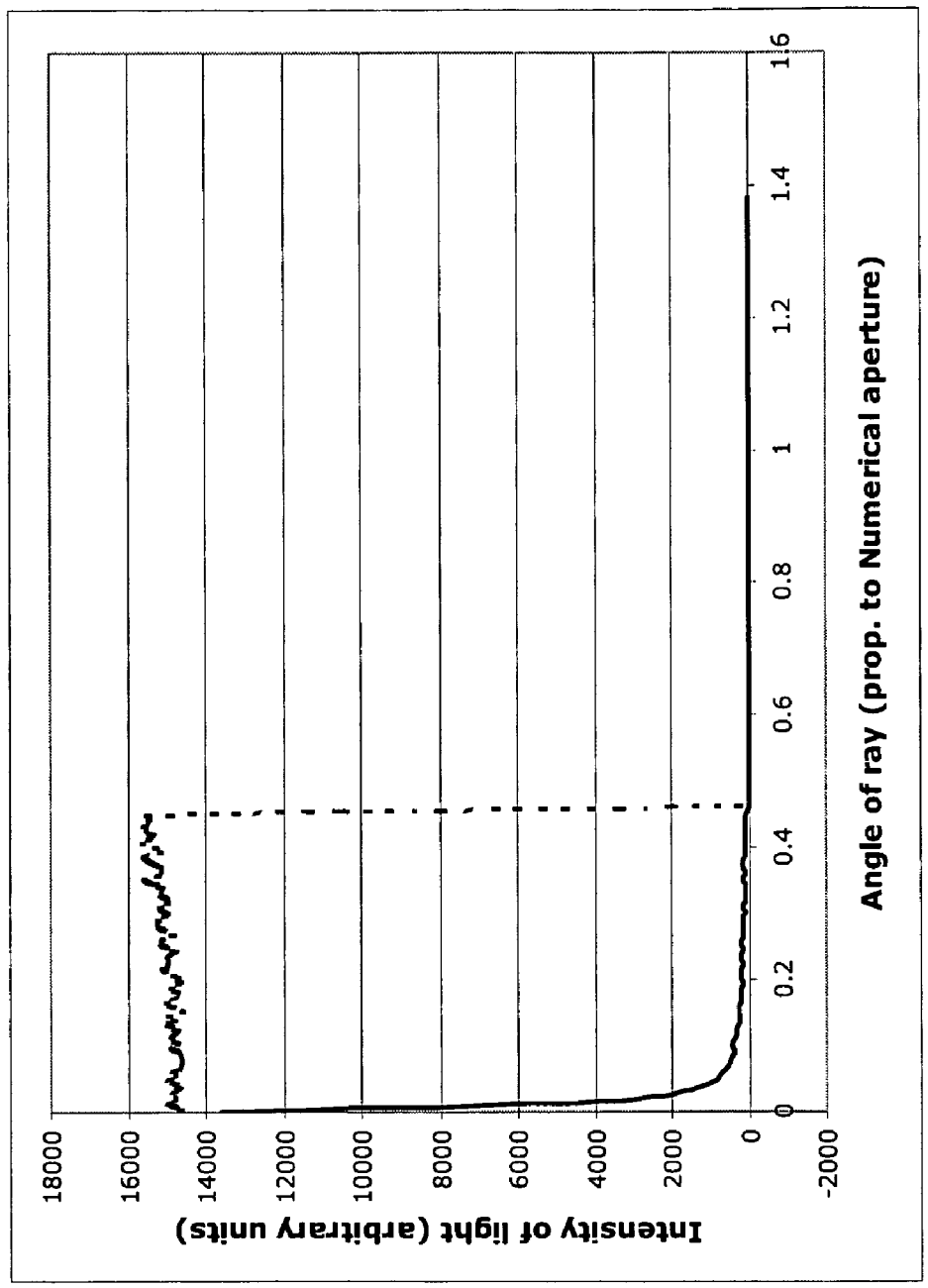
FIG. 29, in an X-Y graph, illustrates the absorption of light in a doped core double-clad optical fibre as a function of the numerical aperture of the rays propagating within the optical fibre.

FIG. 29 illustrates an example of modes absorption in an optical fibre having such characteristics. A substantially octagonal 1-meter long optical fibre having a 10 μm core and a 200 μm cladding has been simulated. The numerical aperture of the core was 0.06, the numerical aperture of the cladding 0.46, and light has been injected along the cross-section of this optical fibre in a substantially circularly symmetric and homogenous manner (numerical aperture=0.22). For simulation purposes, the absorption of radiation by the doped core has been considered to be relatively large ($10^6$/μm) to reduce simulation time, but it is expected that these results are readily extendable to more realistic situations.

As shown in this Figure, light having a substantially uniform distribution in numerical apertures along a predetermined interval of numerical apertures (dotted line) has been injected in the optical fibre. After some of the injected light has been absorbed by the optical fibre, the distribution in numerical apertures takes the form shown in full line, which indicates that large numerical aperture modes are absorbed relatively quickly relatively to low numerical aperture modes. This will therefore reduce losses at the optical coupler 1020 as only a small percentage of the light incoming into the optical fibre 1004 will be able to escape from the optical amplifier 1000 in the direction of the second pump light source 1016.

In some embodiments of the invention, the first and second locations are spaced apart by a distance such that losses in the second optical coupler 1020 of light incoming in the optical fibre 1004 at the second location are at most 1 dB or, in some embodiments, at most about 0.5 dB. This magnitude of absorption losses is substantially similar to losses due to the optical coupler itself and is therefore tolerable as the various optical components making out the amplifier 1000 are conceived to be able to resist power losses of this order of magnitude.

In some embodiments of the invention, the optical fibre 1004 has substantially constant diameter core, inner cladding and outer cladding along its length. However, in alternative embodiments of the invention, the optical fibre 1004 defines a first fibre section located downstream from the signal coupler 1012 and a second fibre section located downstream from the first fibre section. For example, the first fibre section is substantially adjacent the first location and the second fibre section is substantially adjacent the second location.

The first fibre section has a first core-to-cladding ratio between a transversal cross-sectional area of the doped core in the first section and a transversal cross-sectional area of the inner cladding in the first fibre section. The second fibre section has a second core-to-cladding ratio between a transversal cross-sectional area of the doped core in the second section and a transversal cross-sectional area of the inner cladding in the second fibre section.

In some embodiments, the second core-to-cladding ratio is larger than the first core-to-cladding ratio. In other words, the optical fibre in these embodiments is such that light is increasingly guided into the doped core 1006 as the pump light propagates downstream relatively to the optical signal 1002. For example, the optical fibre 1004 is such that this tapering is substantially gradual, for example substantially linear between the first and second locations. Also, this tapering may continue downstream from the second location. In yet other embodiments of the invention, this tapering is stepwise and, therefore, the optical fibre defines sections having substantially uniform dimensions in the radial direction.

The present invention is usable with many types of fibres that are suitable for amplifying optical signals. For example, in some embodiments, the doped core 1006 is a rare earth doped core. Examples of suitable rare earths include $Yb^{3+}$, $Er^{3+}$, $Tm^{3+}$ and $Ho^{3+}$ and combinations thereof, among other possibilities. In other embodiments of the invention, the doped core 1006 is a transition metal doped core, including for examples $Cr^{3+}$ and $Cr^{4+}$. In some embodiments of the invention, the doped core 1006 is non-polarization maintaining, while in other embodiments of the invention, the doped core 1006 is polarization maintaining. In some embodiments of the invention, a similar structure is used not to amplify a signal, but to produce a laser light.

It should be noted that the present invention is also usable in fibre lasers by replacing the signal coupler by a substantially perfect mirror and including a partially reflecting filter at the output of the optical fibre 1004, for example and non-limitingly, a partially reflecting filter having a reflectivity of about 0.04.

Figure 28:
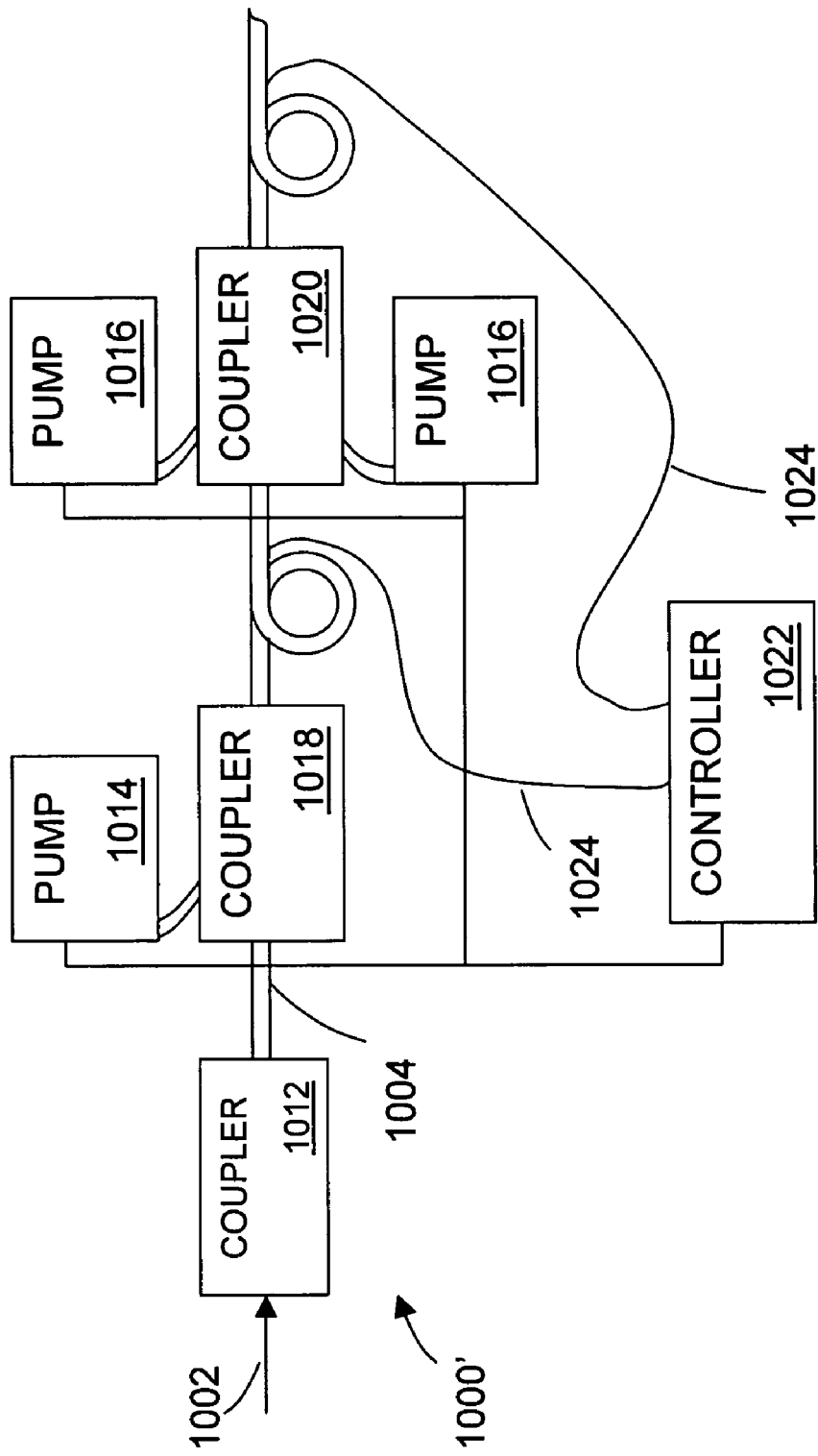
FIG. 28, in a schematic view, illustrates an optical amplifier in accordance with an alternative embodiment of the present invention, the optical amplifier including a feedback loop added to the optical amplifier shown in FIG. 27.

FIG. 28 illustrates an alternative embodiment of the invention wherein a gain controller 1022 allows to control the first and second powers to optimize the operation of an alternative optical amplifier 1000'. The optical amplifier 1000' is similar to the optical amplifier 1000 in that it includes all the components described hereinabove. In addition, the gain controller 1022 is optically coupled to the optical fibre 1004 for tapping a portion of the optical signal 1002 from the optical fibre 1004. For example, this may be achieved using tapping fibres 1024 that tap the optical signal 1002 and bring the tapped portion to the controller 1022 so that optical characteristics of the optical signal may be measured. Such optical tapping is well known in the art and will therefore not be further described.

In some embodiments of the invention, only the total amplified signal at the output of the optical amplifier 1000' is tapped. However, in alternative embodiments of the invention, the signal is tapped at many locations along the optical fibre 1004, for example, once after each amplification stage, among other possibilities.

The gain controller 1022 is further operatively coupled to the first and second pump light sources 1014 and 1016 for controlling the first and second powers. This is achievable in any suitable manner using techniques that are well-known in the art. Also, this is achievable in the case in which the pump light is provided by a single source by controlling the manner in which the pump light is split to obtain the first and second pump lights.

The gain controller 1022 is provided for maximizing a signal-to-noise ratio of the optical amplifier 1000' according to a predetermined constraint. For example, the optical amplifier 1000' operates under constant total gain and the first and second powers are then adjusted such that this gain is maintained while the signal-to-noise ratio of the optical amplifier 1000' is maximized. In other embodiments of the invention, the optical amplifier 1000' operates under constant pump power and, in these embodiments, the first and second pump powers are adjusted such that they total remain constant but the signal-to-noise ratio of the optical amplifier 1000' is maximal. Alternatively, the gain controller 1022 may be provided for minimizing a total amplified spontaneous emission noise in the optical amplifier. Control methods suitable for achieving these results are similar to the methods used in concatenated fiber amplifiers.

In summary, the optical amplifiers 1000 and 1000' operate by guiding an optical signal 1002 into the doped core 1006, guiding a first pump light having a first pump power into the inner cladding 1008 at a first location along the optical fibre 1004 and guiding a second pump light having a second pump power into the inner cladding 1008 at a second location along the optical fibre 1004. The second pump power is larger than the first pump power and the first and second pump light amplifies the optical signal so as to simultaneously increase the total amplification gain achievable by the optical amplifier and a signal-to-noise ratio characteristic of the optical fibre.

The following paragraphs describe an example of optical couplers usable as the first and second optical couplers 1018 and 1020. These optical couplers are only examples of optical couplers usable with the above-described optical amplifier, but they have been found to be suitable for such a use. However, the enclosed description should not be interpreted as limiting the type of optical couplers usable with the present invention.

FIGS. 1 to 3 illustrate an optical coupler 10 in accordance with an embodiment of the present invention. The optical coupler 10 is usable for optically coupling a first optical fibre 12 to a second optical fibre 16. In some embodiments of the invention, as seen in FIGS. 1 to 3, more than one optical fibre 12 are optically coupled to the second optical fibre 16. For example, these other optical fibres take the form of a bundle of fibres 13. In summary, the optical coupler 10 is manufacturable such that it includes a surface for coupling to the second optical fibre 16 in a substantially radial direction. The surface is formed so as to have a shape that substantially conforms to the outer surface of the second optical fibre 16.

The optical coupler 10 is configured and has optical properties such that essentially all the light incoming at the first optical fibre 12 is guided into the second optical fibre 16. Typically, this is achieved by adiabatically tapering the optical coupler 10 into the second optical fiber 16 substantially opposite to the first optical fibre 12. To that effect, the optical coupler 10 is configured so as to be substantially tangential to the second optical fibre at a location wherein the optical coupler 10 ceases to contact optical fibre 10. This results in the optical coupler 10 coupling the light incoming at the first optical fibre 12, and at the other optical fibres of the bundle of optical fibres 13, to the cladding of the second optical fibre 16.

Typically, the optical coupling between the first optical fibre 12 and the second optical fibre 16 is a multimode coupling. In this case, the first optical fibre 12, and the other optical fibres of the bundle of optical fibres 13 are multimode fibres. In various embodiments of the invention, the second optical fibre is a multimode optical fibre, a multiple core optical fibre, a double-clad optical fibre, a single-mode optical fibre or any other suitable optical fibre.

The first optical fibre 12 defines a first fibre free end 14. It should be understood that the first fibre free end 14 is here shown attached to the optical coupler 10. The term "free end" therefore applies to the configuration of the first optical fibre 12 before it is coupled to the optical coupler 10. Although not shown in the drawings, the first optical fibre 12 includes a first fiber core and a first fiber cladding extending substantially radially outwardly from the first fibre core.

Similarly, the second optical fibre 16 defines a second fibre free end 18. Also, the second optical fibre 16 includes a second fibre core 24 and a second fibre cladding 26 extending substantially radially outwardly from the second fibre core 24. Typically, the second fibre core and cladding 24 and 26 are both substantially cylindrical. For clarity reasons, the second fibre core and cladding 24 and 26 are not distinguishly shown in the other Figures of the present application.

As better seen in FIG. 3, the second optical fibre 16 defines a second fibre coupling section 20 and a second fibre transmitting section 22 extending from the second fibre coupling section 20. The second fibre coupling section 20 defines a radially outwardmost peripheral surface 28. The radially outwardmost peripheral surface 28 is typically defined by the second fibre cladding 26. The radially outwardmost peripheral surface 28 defines a peripheral surface coupling portion 30. The peripheral surface coupling portion 30 is a portion of the radially outwardmost peripheral surface 28 through which light coming from the first optical fibre 12, or from other similarly located optical fibres, enters into the second optical fibre 16. In the optical coupler shown in FIGS. 1 to 3, the peripheral surface coupling portion 30 and the radially outwardmost peripheral surface 28 are substantially the same as light may enter the second optical fibre 16 from any direction.

The optical coupler 10 defines a coupler first end section 36 and a substantially opposed coupler second end section 38.

The coupler first end section 36 defines a first coupling surface 40. Also, the optical coupler 10 defines a second coupling surface 42 extending between the coupler first and second end sections 36 and 38. In the embodiment of the invention shown in FIGS. 1 to 3, the coupler second end section 38 extend substantially longitudinally from the coupler first end section 36. However, in alternative embodiments of the invention, the coupler first and second end sections 36 and 38 are not adjacent to each other.

The first optical fibre 12 is optically coupled with the coupler first coupling surface 40. Also, the peripheral surface coupling portion 30 is positionable so as to extend substantially parallel to the second coupling surface 42 and is optically coupled with the second coupling surface 42.

The optical coupler 10 has optical and geometrical properties such that substantially all the light guided to the coupler first coupling surface 40 by the first optical fibre 12 is directed towards the second coupling surface 42 and into the second optical fibre 16 through the peripheral surface coupling portion 30 so as to be guided into the second fibre coupling section 20 for transmission into the second fibre transmitting portion 22.

For example, this is achieved by having an optical coupler 10 that includes a tapered section 44 tapering in a direction leading from the coupler first end section 36 towards the coupler second end section 38. For example, and non-limitingly, the tapered section 44 is located substantially distally relatively to the first fiber free end 14 and extends substantially longitudinally from the coupler first end section 36. In a specific embodiment of the invention shown in FIGS. 1, 2 and 3, the optical coupler first end section 36 is substantially cylindrical and the coupler second end section 38 is substantially frusto-conical. The rotational symmetry of these configurations facilitates manufacturing of the optical coupler 10 and the attachment of many optical fibres to the first coupling surface 40.

The optical coupler 10 defines a coupler passageway 46 extending between the coupler first and second end sections 36 and 38. More specifically, the coupler passageway 46 extends between the ends of the optical coupler 10. The second coupling surface 42 is located substantially peripherally relatively to the coupler passageway 46. In other words, the internal surface of the optical coupler 10 defining the coupler passageway 46 is, in this embodiment of the invention, the second coupling surface 42. The second coupling surface 42 is therefore substantially cylindrical. This configuration allows to have many optical fibres similar to the first optical fibre 12 attached to the optical coupler 10 such that the light incoming for all these optical fibres is guidable into the second optical fibre 16.

As seen in FIG. 1, the coupler passageway 46 is radially substantially centrally located relatively to the coupler first end section 36. However, it should be noted that, as described in further details hereinbelow, many other suitable shapes exist for the optical coupler 10.

Figure 23:
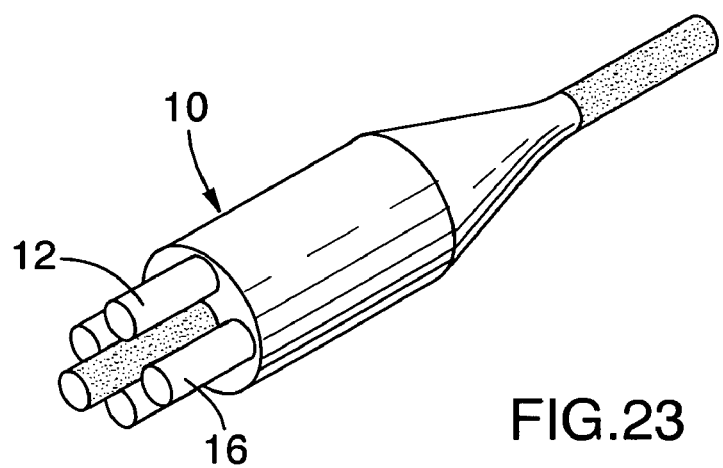
FIG. 23, in perspective view, illustrates the optical coupler shown in FIGS. 1 to 3 optically coupled to two optical fibres, one of which is glued to the optical coupler inside a coupler passageway extending longitudinally through the optical coupler.
Figure 24:
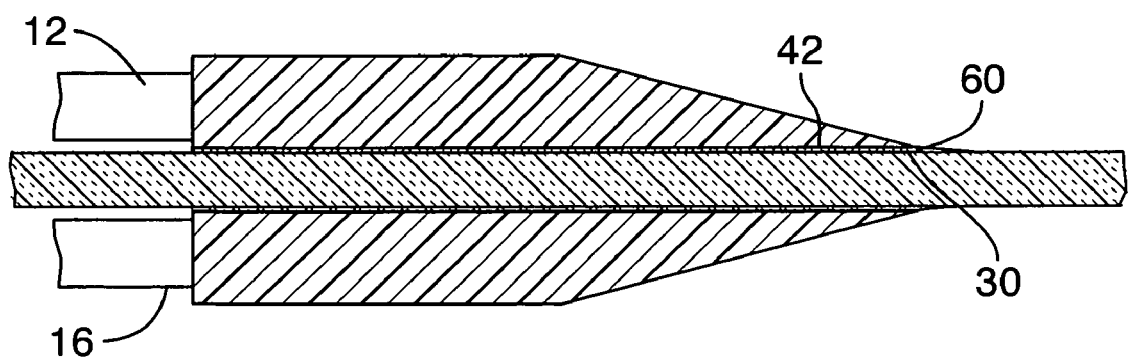
FIG. 24, in a side cross-sectional view, illustrates the optical coupler shown in FIG. 23.

As seen in FIGS. 23 and 24, in some embodiments of the invention, the peripheral surface coupling portion 30 is optically coupled to the second coupling surface 42 by a coupling medium 60 located between the second coupling surface 42 and the peripheral surface coupling portion 30. An example of such a coupling medium 60 is ethanol or any other suitable transparent liquid. Another example of such a coupling medium 60 is a bonding material. Typically, the coupling medium 60 has a refraction index substantially similar to the refraction index of the second fibre cladding 26. Also, typically, the optical coupler 10 has also the same refraction index as the second fibre cladding 26. In other embodiments of the invention, as seen in FIGS. 1 to 3, the second coupling surface 42 and the peripheral surface coupling portion 30 are fused to each other.

The diameter of the coupler first end section 36 is selected as a function of the diameters and numerical apertures of the first and second optical fibres 12 and 16 such that optimal coupling between the first and second optical fibres occurs.

As an example, in an embodiment of this invention, a cylindrical tube of 800 μm external diameter and 405 mm internal diameter is used. The tube is cut to the length of 2 cm. The tube is then etched or polished to obtain a conical shape over 1 cm at one end as per FIGS. 1-3 to complete manufacturing of the optical coupler. At the cylindrical end, up to 9 200-micron core fibres (numerical aperture (NA) of 0.22) can be fused to the first coupling surface. Once this is done, a 20 μm core/400 μm diameter double clad fibre is first stripped of its low index polymer jacket (NA=0.46 for the guiding cladding), then is cleaved to about 3 cm of the fibre jacket end. This fibre end is then inserted into the coupler passageway of the optical coupler from the end of the first coupling surface so that it exits from the other end. A second 20/400 μm double clad fibre is stripped and cleaved and the ends of the last two fibres are aligned to transmit light. This alignment is optimized and the fibres are spliced using a heat source. The heat source is than gradually scanned towards the conical part of the optical coupler, which thus collapses on the internal fibre, thus creating a coupling between the tube and the inner fibre. This enable light guided from the multimode optical fibre to be coupled into the double-clad fibre with only a few percent loss. The thus obtain optical structure is then packaged for protection.

Another embodiment of this invention is obtained by following than same procedure as above but use a 340 μm external diameter tube with a 130 internal diameter. Then, 6 105 μm core fibers with 0.15 NA can be spliced to the tube and a 125 μm cladding diameter double-clad fibre can be inserted into the coupler passageway and coupled into after fusion the various parts. This assembly will also be relatively low loss.

As seen in FIG. 1, the first optical fibre 12 is substantially longitudinally coupled to the first coupling surface 40. In other words, the first coupling surface 40 is substantially perpendicular to the first optical fibre 12. In this embodiment of the invention, the first coupling surface 40 is also substantially perpendicular to the second coupling surface 42. In these embodiments, there is an optimization of numerical apertures of the first and second optical fibres 12 and 16 that are usable efficiently to transfer light from the first optical fibre to the second optical fibre 16.

In use, the optical coupler 10 is may be provided separately from the first and second optical fibres 12 and 16. Then, the first optical fibre 12 is positioned substantially adjacent to the first coupling surface 40. Afterwards, the first optical fibre 12 is optically coupled to the first coupling surface 20. For example, this is performed by splicing the first optical fibre with the first coupling surface. Afterwards, the second optical fibre 16 is positioned such that the second coupling surface 42 is substantially adjacent and substantially parallel to the peripheral surface coupling portion 30. Then, the second coupling surface 42 and the peripheral surface coupling portion 30 are optically coupled to each other.

For example, the second coupling surface 42 and the peripheral surface coupling portion 30 are optically coupled to each other by fusing the second coupling surface 40 and the peripheral surface coupling portion 42 to each other. In other embodiments of the invention, the second coupling surface and the peripheral surface coupling portion are secured to each other using a bonding material.

As mentioned hereinabove, the first optical fibre 12 is typically optically coupled to the optical coupler 10 and secured thereto prior to optically coupling and securing the second optical fibre 12 to the optical coupler 10. The substantially cylindrical shape of coupler first end section 36 then facilitates assembly of the optical coupler 10 into a suitable package as the optical coupler 10 may then be held through this cylindrical portion of the optical coupler 10 instead of being held through the first optical fibre 12. This reduces surface stresses at the interface between the first optical fibre 12 and the optical coupler 10. Similarly, since the second optical fibre 16 is inserted through the coupler passageway 46, stresses at the interface between the second optical fibre 16 and the optical coupler 10 are also thereby minimized.

As shown in FIG. 4, in alternative embodiments of the invention, an optical coupler 710 includes coupler passageway 746 having a first diameter 48 in the first end section 36 and the coupler second end section 38 has a coupler second diameter 50. The second diameter 50 is substantially smaller than the first diameter 48. For example, this may be achieved by providing a coupler passageway 46 of substantially uniform diameter and then collapsing the coupler passageway 46 onto the second optical fibre 16. However, in alternative embodiments of the invention, this configuration of diameters pre-manufactured before the second optical fibre 16 is inserted through the coupler passageway 46.

These embodiments of the invention are particularly advantageous in applications wherein it is desirable that a sheath 27 of the second fibre 16 be partially inserted into the coupler passageway 746. However in alternative embodiments of the invention, the sheath 27 is not inserted in the coupled passageway 746.

Figure 5:
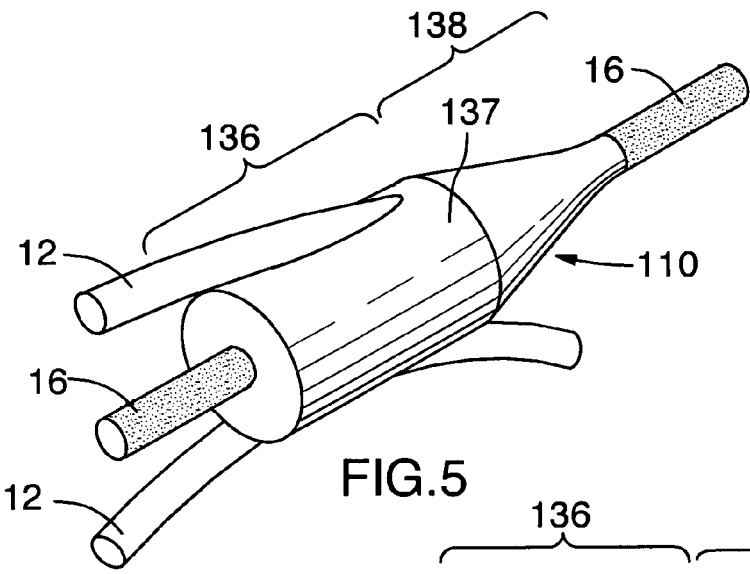
FIG. 5, in a perspective view, illustrates an optical coupler in accordance with another alternative embodiment of the invention optically coupled to two optical fibres in two alternative manners.
Figure 6:
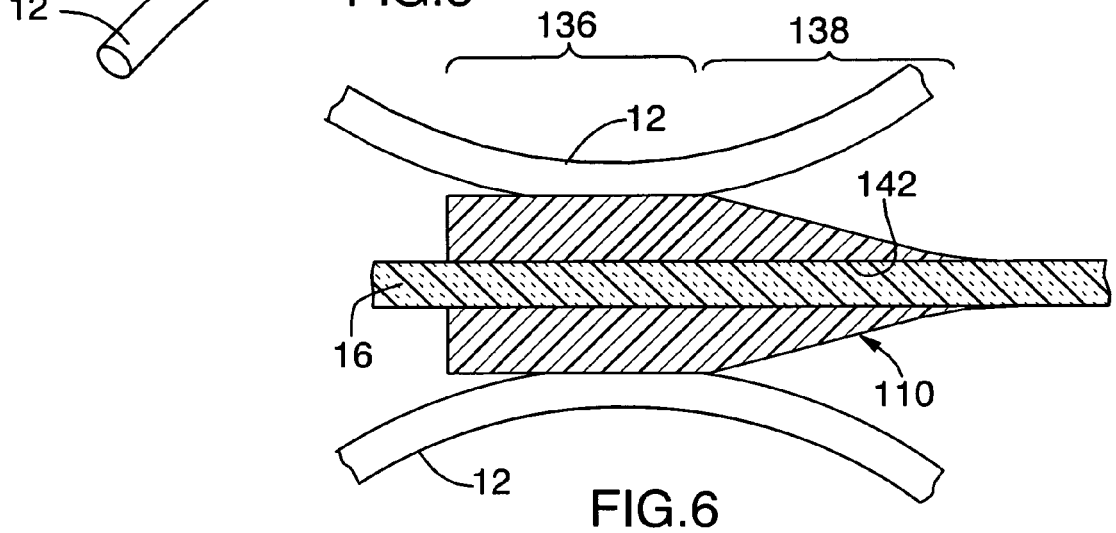
FIG. 6, in a side cross-sectional view, illustrates the optical coupler shown in FIG. 5 coupled to two optical fiber in a first manner.
Figure 7:
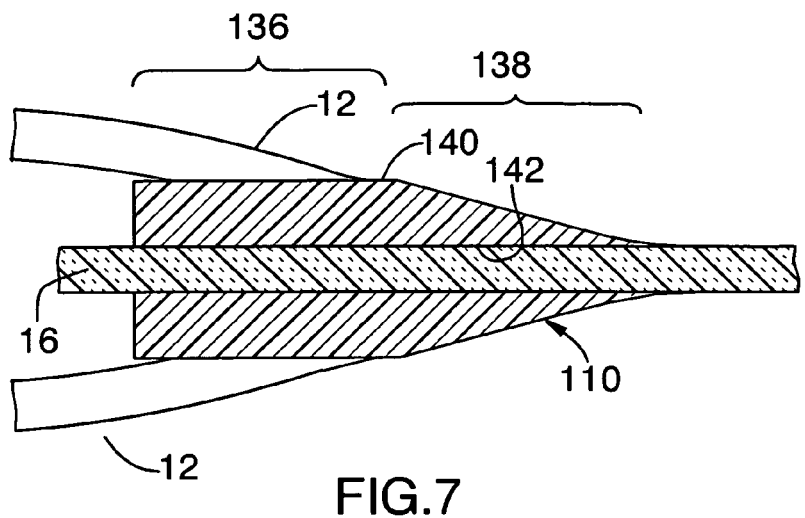
FIG. 7, in a side cross-sectional view, illustrates the optical coupler shown in FIGS. 5 and 6 coupled to two optical fiber in a second manner.

As shown in FIGS. 5, 6 and 7, in alternative embodiments of the invention, the first optical fibre 12 is spliced to the radially outwardmost peripheral surface 137 of the coupler first end section 36 of an alternative optical coupler 136. In these embodiments of the invention, the first and second coupling surfaces 140 and 142 are therefore parallel to each other, but this is not necessarily the case in all embodiments of the invention. This may be achieved by terminating the first optical fibre 12 at the optical coupler 110 or by tangentially optically coupling the first optical fibre 12 to the optical coupler 110. While FIG. 5 represents en embodiment of the invention wherein these two types of coupling are present simultaneously, typically all the first optical fibers 12 coupled to an optical coupler 110 either terminate at the optical coupler 110, as seen in FIG. 7, or are tangentially optically coupled to the first optical coupler 110, as seen in FIG. 6.

In yet other embodiments of the invention, as shown in FIGS. 8A and 9, an alternative optical coupler 210 includes a first tapered section 54 tapering in a direction leading from a coupler first end section 236 towards a coupler second end section 238 and a second tapered section 56 tapering in a direction leading from the coupler second end section 238 towards the coupler first end section 236. The second tapered section 56 extends substantially adjacent to the first tapered section 54 so as to define a neck 58 in the optical coupler. Typically, the second optical fibre 16 is optically coupled to the optical coupler 210 in a region substantially adjacent the neck 58. By reducing as much as possible the cross-sectional surface area of the optical coupler 210 in the vicinity of the neck 58, a relatively large portion of the light incoming at the first optical fibre 12 is guided into the second optical fibre 16. Also, in similar embodiments of the invention, this percentage of light coupled into second optical fibre 16 may be increased by having an optical coupler 210' defining two or more necks 58, as shown in FIG. 8B. Furthermore, the power coupled into different sections of the second optical fibre 16 may be selected by varying the length over which the second optical fibre is spaced apart from the internal surface of the coupler 210' between the two necks 58.

As shown in FIGS. 10, 11 and 12, in some embodiments of the invention, the second coupling surface 330 of an alternative optical coupler 310 is shaped substantially similarly to a circumferentially interrupted segment of a cylindrical shell. Therefore, in these embodiments of the invention, the second optical fibre 16 is not inserted through a passageway present in the optical coupler, but is instead abutted against the second coupling surface 230 prior to being optically coupled thereto. This configuration is particularly advantageous when a relatively small number of optical fibres are to be coupled to the second optical fibre 16. Indeed, it is then relatively more easily achievable to optically couple the optical fibres in this manner as it reduces the effective surface area of the optical coupler 210 that is used to couple the light into the second optical fibre 16 and, therefore, increases a range of numerical apertures of the first and second optical fibres 12 and 16 that may be used with the optical coupler 310.

Figure 13:
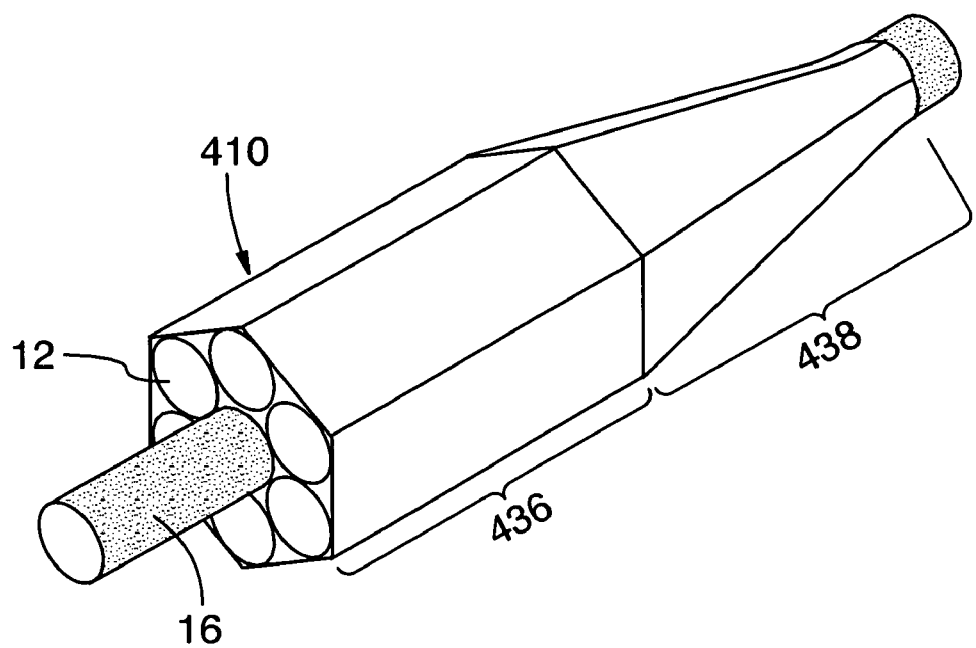
FIG. 13, in a perspective view, illustrates an optical coupler in accordance with yet another embodiment of the invention optically coupled to one optical fibre.
Figures 14, 15:
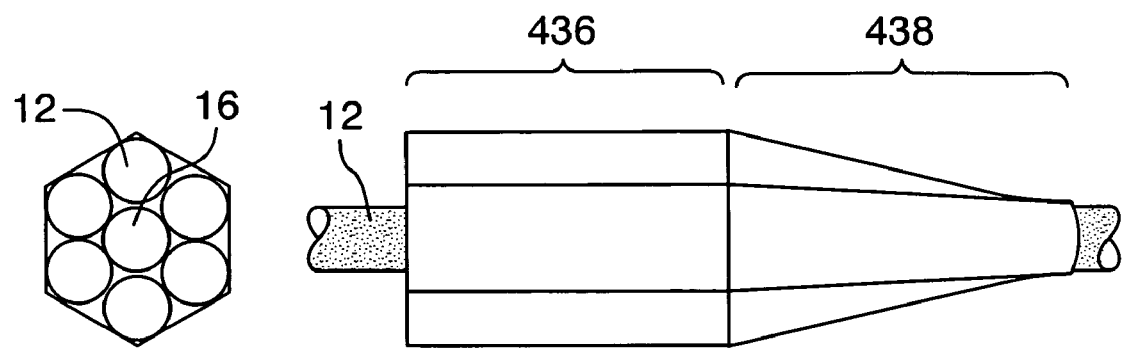
FIG. 14, in a rear plan view, illustrates the optical coupler shown in FIG. 13.
FIG. 15, in a side elevation view, illustrates the optical coupler shown in FIGS. 13 and 14.

In yet other embodiments of the invention, an optical coupler 410, shown in FIGS. 13, 14 and 15, has first and second end sections 336 and 338 that have substantially polygonal cross-sections in a direction substantially perpendicular to the second coupling surface 42. For example, as seen more specifically in FIG. 13, the coupler first and second end sections 436 and 438 have a substantially hexagonal cross-sectional configuration. The use of a polygonal cross-section instead of a circular cross-section in manufacturing the optical coupler 410 reduces the effective surface area in a direction perpendicular to light propagation and, therefore, once again, optimizes the optical coupling of the first and second optical fibres 12 (only the footprint of which is shown) and 16 to each other with regards to constraints put on numerical apertures.

It should be noted that in alternative embodiments of the invention, any other polygonal configuration may be taken by an alternative optical coupler similar to the optical coupler 410. Also, in yet other alternative embodiments of the invention, only one of the coupler first and second end sections of a similar optical coupler has a polygonal configuration.

In these embodiments, the polygonal configuration of the optical coupler 410 results in the different modes carried into the optical coupler through the first optical fibre 12 are more easily mixed and, therefore, produce optimal coupling to the second optical fibre 16 over a relatively small longitudinal distance.

FIGS. 16 and 17 and FIGS. 18 and 19 respectively show optical couplers 510 and 610 according to yet other alternative embodiments of the present invention. The optical coupler 510 is an optical coupler for which the coupler passageway 546 is radially substantially eccentrically located relatively to the coupler first end section 536. For example, this configuration is suitable for use when more than one optical fibre 12 must be optically coupled to the second optical fibre 16, but when the number of first optical fibers is such that the use of a symmetrical optical coupler would cause undue constraints regarding the numerical apertures of the various optical fibers that are coupled to each other. Disposing the second optical fibre 16 eccentrically relatively to the first optical fibres 12 allows to optimize the cross-sectional area of the optical coupler 10 as it relates to the ranges of numerical apertures of the optical coupler 510 and the first and second optical fibres 12 and 16 that are usable with each other.

The optical coupler 610 is usable, for example, in cases wherein the same optical fibres 12 are used to pump light into a second optical fibre 16 and a third optical fibre 17 that both extend through the optical coupler 610. To that effect, the optical coupler 610 includes two coupler passageways 646 and 647 extending substantially longitudinally there through. Furthermore, in alternative embodiments of the invention, a similar optical coupler includes more than two coupler passageways.

Figures 16, 17:
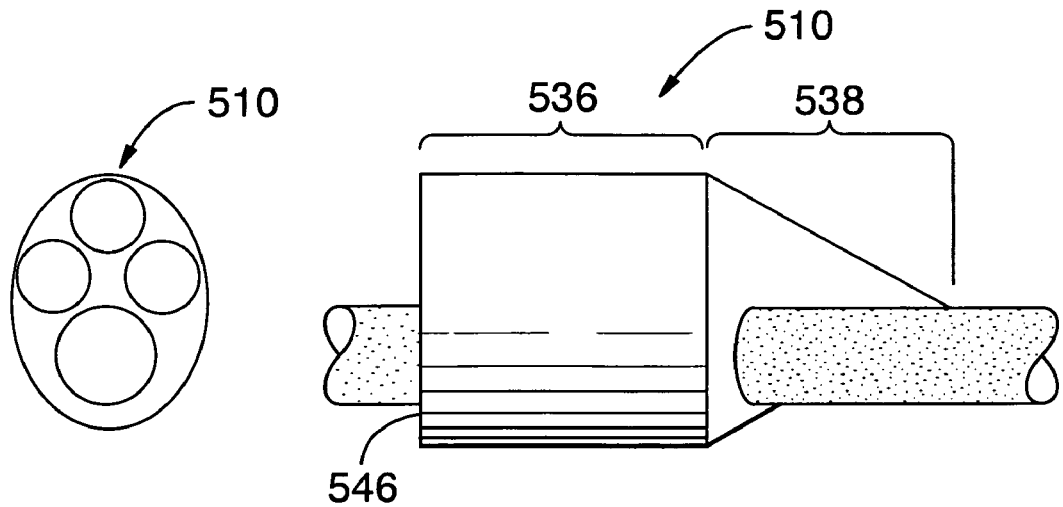
FIG. 16, in a side elevation view, illustrates an optical coupler in accordance with yet another embodiment of the invention optically coupled to one optical fibre.
FIG. 17, in a rear plan view, illustrates the optical coupler shown in FIG. 16.
Figure 18:
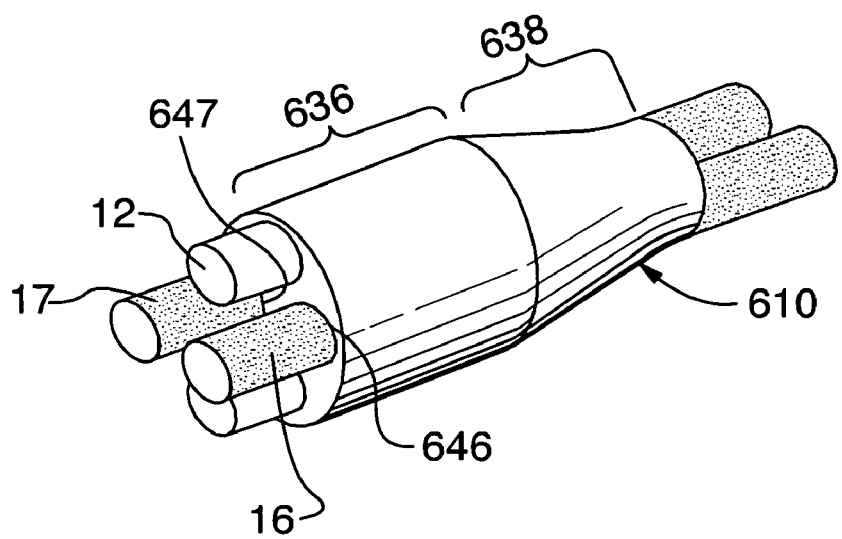
FIG. 18, in a side elevation view, illustrates an optical coupler in accordance with yet another embodiment of the invention optically coupled to one optical fibre.
Figure 19:
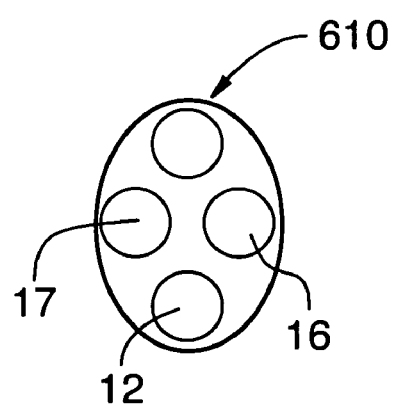
FIG. 19, in a rear plan view, illustrates the optical coupler shown in FIG. 18.

It should be noted that, as seen in FIGS. 17 and 19, optical couplers 510 and 610 need not to have rotational symmetry about a longitudinal axis. Indeed, The optical couplers 510 and 610 have substantially ellipsoidal cross-sectional configuration, once again in the aim of having a cross-sectional surface that is as small as possible while allowing coupling of a number of optical fibres that is as large as possible.

Figure 20:
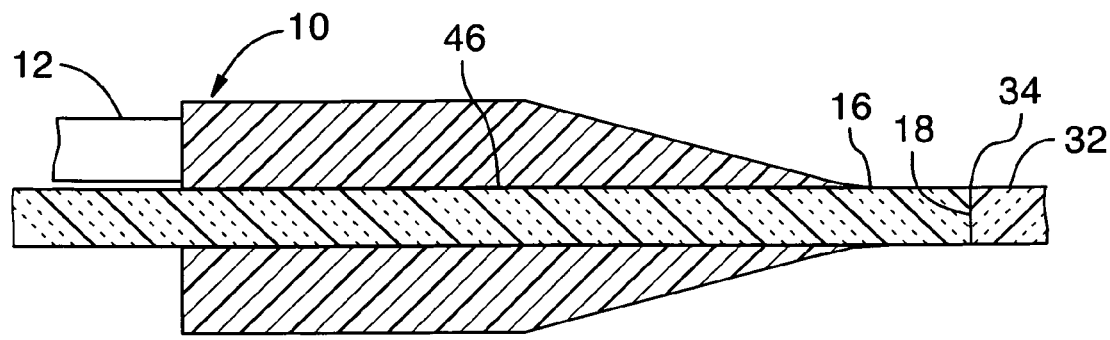
FIG. 20, in a side cross-sectional view, illustrates the optical coupler shown in FIGS. 1 to 3 optically coupled to two optical fibres, one of which is optically coupled outside of the optical coupler to a third optical fiber.
Figure 21:
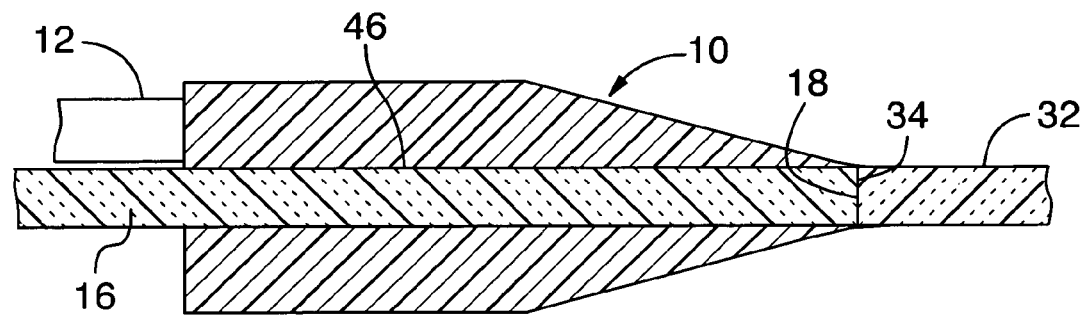
FIG. 21, in a side cross-sectional view, illustrates the optical coupler shown in FIGS. 1 to 3 optically coupled to two optical fibres, one of which is optically coupled at the end of the optical coupler to a third optical fiber.
Figure 22:
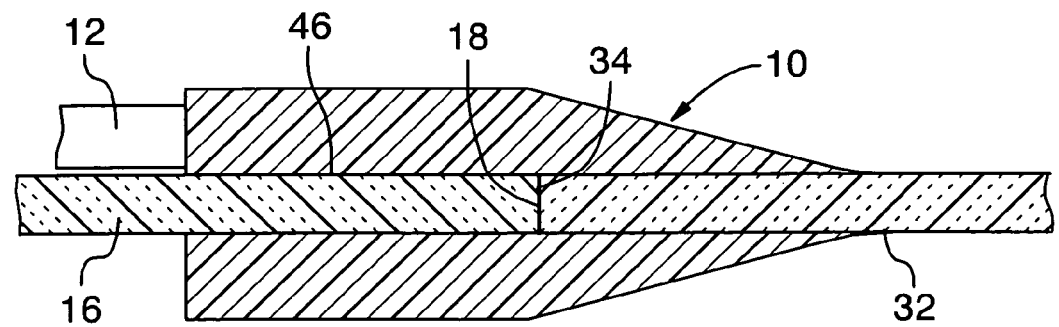
FIG. 22, in a side cross-sectional view, illustrates the optical coupler shown in FIGS. 1 to 3 optically coupled to two optical fibres, one of which is optically coupled inside of the optical coupler to a third optical fiber.

As shown in FIGS. 20, 21 and 22, in some embodiments of the invention, the second optical fibre 16 is optically coupled also to a third optical fibre 32 which defines a third fibre free end 34. More specifically, the second and third fibre free ends 18 and 34 are positioned substantially adjacent to each other and are optically coupled such that light guided into said second optical fibre 16 is guided also into the third optical fibre 32. FIGS. 20, 21 and 22 respectively show embodiments of the invention wherein the second and third fibre free ends 18 and 34 are respectively located outside, at the end of and inside the coupler passageway 46. Also, in embodiments of the invention substantially similar to the optical coupler shown in FIGS. 8 and 9, the junction of the second and third optical fibres is typically located within the neck 58 of an optical coupler.

Figure 25:
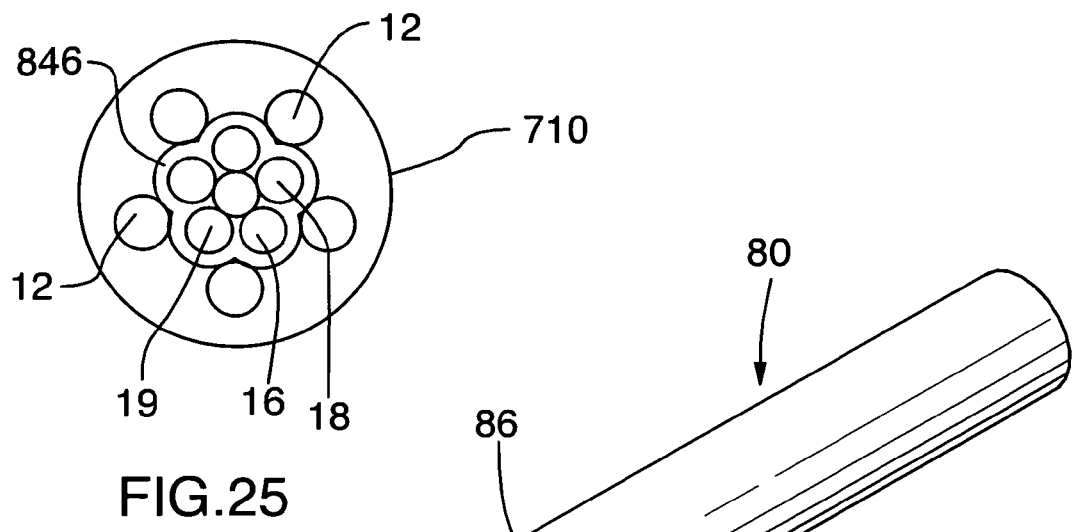
FIG. 25, in a rear elevation, illustrates an optical coupler in accordance with yet another embodiment of the present invention, one of which is part of a fiber bundle inserted through a coupler passageway of the optical coupler.

As seen in FIG. 25, in some embodiments of the invention, the second optical fibre 16 part of a bundle of optical fibres 19 inserted through a coupler passageway 846 of an alternative optical coupler 810. In these embodiments, optically coupling the first optical fibre 12 to the second optical fibre may include inserting the bundle of optical fibres 19 through a substantially cylindrical coupler passageway 846 and heating the optical coupler 810 so as to collapse the coupler passageway 846 onto the bundle of optical fibres 19.

Figure 26A:
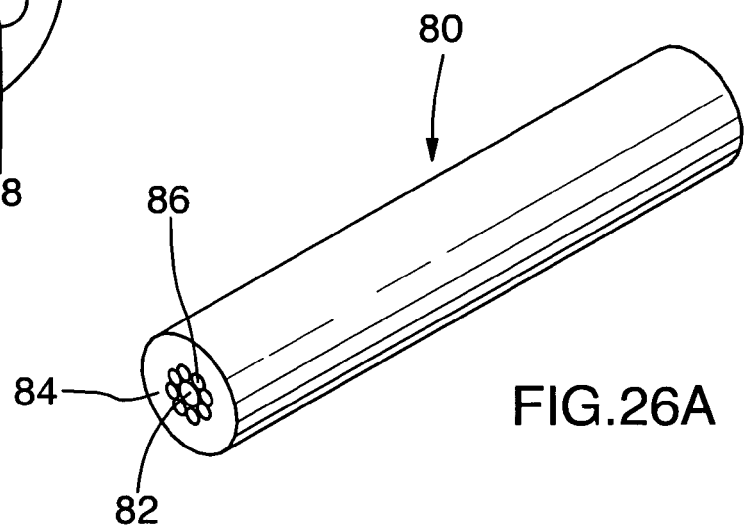
FIG. 26A, in a perspective view, illustrates a first step in a method for manufacturing an optical coupler in accordance with yet another embodiment of the present invention.
Figure 26B:
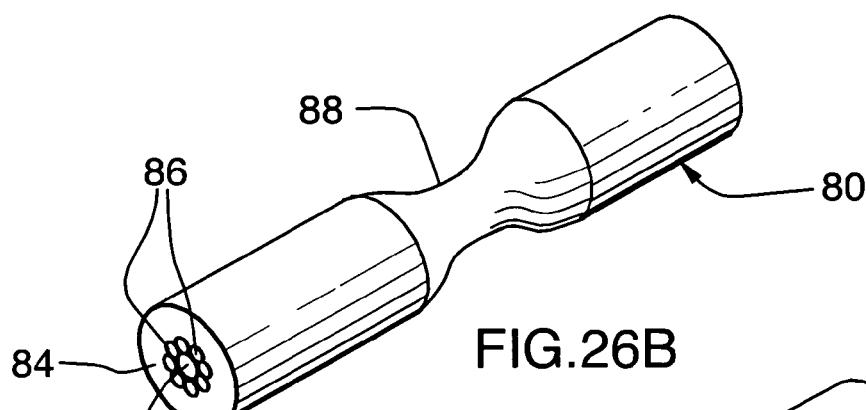
FIG. 26B, in a perspective view, illustrates a second step in the method for manufacturing an optical coupler illustrated in FIG. 26A.
Figure 26C:
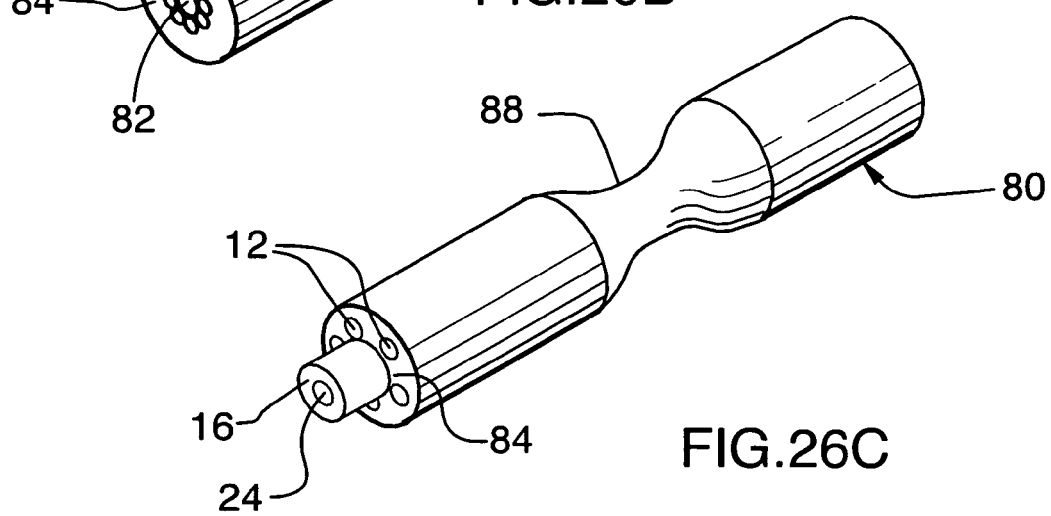
FIG. 26C, in a perspective view, illustrates a third step in the method for manufacturing an optical coupler illustrated in FIGS. 26A and 26B.

In yet other embodiments of the invention, an alternative optical coupler 910 is manufactured as shown in FIGS. 26A to 26C. As seen in FIG. 26A, this method uses a section of an air-clad fiber 80. The air-clad fiber includes a core 82 surrounded by a cladding 84 defining longitudinally extending air holes 86. To manufacture the optical coupler 910, the cladding 84 is etched to form a neck 58, as seen in FIG. 26B. Typically, the cladding 84 is etched as much as practically feasible to obtain a relatively narrow neck 58. Then, the air holes 86 are collapsed around the core 82, at least on one side of the neck 58. Subsequently, the first optical fiber 12 is optically coupled to the cladding 84 and the second fiber core 24 is optically coupled to the core 82, as seen in FIG. 26C.

From the above, it can be seen that, in some embodiments of the invention, the first optical coupler 1018 is an optical coupler having a relatively small numerical aperture such as, for example, the optical coupler 510 or the optical coupler 310. Also, the optical coupler 1020 is an optical coupler having a relatively large numerical aperture such as, for example, the optical coupler 10.

In some embodiments of the invention, the optical couplers each have a numerical aperture larger than upstream located optical coupler and are configured, sized and coupled to the sources of pump light in a manner such that relatively large numerical aperture modes are preferably injectable into the optical fibre. Also, in some embodiments of the invention, the optical fibre is such that its numerical aperture increases at each coupler, once again reducing power losses at each coupler. This is advantageous in our application as high numerical aperture modes are absorbed faster in the optical fibre 1004 and, therefore, the optical couplers, for example the first and second optical couplers 1018 and 1020 are then positionable relatively close to each other.

The above therefore suggests a method of assembling an optical amplifier, for example the optical amplifier 1000. The method includes providing a doped core optical fibre; coupling a first source of pump light to the optical fibre at a first location therealong; and coupling a second source of pump light to the optical fibre at a second location therealong, the second location being spaced apart from the first location. For example, this is achievable by using the optical couplers described hereinabove, and more specifically by coupling the optical couplers described hereinabove to the doped core optical fiber and afterwards attaching pump optical fibres to the optical couplers, the pump optical fiber being usable to guide pump light into the optical couplers.

Although the present invention has been described hereinabove by way of preferred embodiments thereof, it can be modified, without departing from the spirit and nature of the subject invention as defined in the appended claims.

What is claimed is:

1. An optical amplifier for amplifying an optical signal, said optical amplifier comprising:
   an optical fibre, said optical fibre including a doped core, an inner cladding extending substantially radially outwardly from said doped core and an outer cladding extending substantially radially outwardly from said inner cladding;
   a signal coupler for receiving said optical signal and guiding said optical signal into said doped core;
   a first pump light source for producing a first pump light having a first power, said first pump light source being optically coupled to said optical fibre at a first location therealong for guiding said first pump light into said inner cladding at said first location; and
   a second pump light source for producing a second pump light having a second power, said second power being larger than said first power, said second pump light source being optically coupled to said optical fibre at a second location therealong for guiding said second pump light into said inner cladding at said second location;
   wherein said first location is located between said signal coupler and said second location; and wherein said signal coupler, said first pump light source and said second pump light source guide respectively said optical signal, said first pump light and said second pump light in said optical fibre in a manner such that said optical signal, said first pump light and said second pump light propagate substantially in the same direction in said optical fibre, said optical fibre extending uninterrupted between said first and second locations.

2. An optical amplifier as defined in claim 1, wherein said first and second locations are distanced by a distance such that said first pump power is only partially absorbed by said doped core between said first and second locations.

3. An optical amplifier as defined in claim 2, wherein said first pump light includes higher numerical apertures modes and lower numerical apertures modes, said optical fibre having optical properties such that said higher numerical aperture modes are absorbed to a larger extent than said lower numerical aperture modes by said optical fibre.

4. An optical amplifier as defined in claim 3, wherein said second pump light is injected in said optical fiber predominantly in numerical aperture modes higher than said lower numerical aperture modes.

5. An optical amplifier as defined in claim 4, wherein said first and second locations are spaced apart by a distance such that losses of pump light in said second optical coupler are at most about 1 dB.

6. An optical amplifier as defined in claim 1, wherein said first and second powers are such that a combined amplified spontaneous emission noise produced by said first and second pump lights in said optical fibre is minimal.

7. An optical amplifier as defined in claim 1, wherein said optical amplifier has a gain of from about 3 dB to about 10 dB between said first and second locations.

8. An optical amplifier as defined in claim 1, wherein said optical fibre defines a first fibre section located downstream from said signal coupler and a second fibre section located downstream from said first fibre section, said first fibre section having a first core-to-cladding ratio between a transversal cross-sectional area of said doped core in said first section and a transversal cross-sectional area of said inner cladding in said first fibre section, said second fibre section having a second core-to-cladding ratio between a transversal cross-sectional area of said doped core in said second section and a transversal cross-sectional area of said inner cladding in said second fibre section, said second core-to-cladding ratio being larger than said first core-to-cladding ratio.

9. An optical amplifier as defined in claim 1, further comprising a gain controller, said gain controller being optically coupled to said optical fibre for tapping a portion of said optical signal from said optical fibre and operatively coupled to said first and second pump light sources for controlling said first and second powers, said optical amplifier being operative for maximizing a signal to noise ratio of said optical amplifier under a predetermined constraint.

10. An optical amplifier as defined in claim 9, wherein said predetermined constraint includes keeping substantially constant a total gain of said optical amplifier.

11. An optical amplifier as defined in claim 9, wherein said predetermined constraint includes keeping substantially constant a sum of said first and second powers.

12. An optical amplifier as defined in claim 1, further comprising a gain controller, said gain controller being optically coupled to said optical fibre for tapping a portion of said optical signal from said optical fibre and operatively coupled to said first and second pump light sources for controlling said first and second powers, said optical amplifier being operative for minimizing a total amplified spontaneous emission noise of said optical amplifier under a predetermined constraint.

13. An optical amplifier as defined in claim 12, wherein said predetermined constraint includes keeping substantially constant a total gain of said optical amplifier.

14. An optical amplifier as defined in claim 12, wherein said predetermined constraint includes keeping substantially constant a sum of said first and second powers.

15. An optical amplifier as defined in claim 1, wherein said doped core is a rare earth doped core or a transition metal doped core.

16. An optical amplifier as defined in claim 1, wherein said doped core includes an ion selected from the set consisting of $Yb^{3+}$, $Er^{3+}$, $Tm^{3+}$, $Ho^{3+}$, $Cr^{3+}$ and $Cr^{4+}$.

17. An optical amplifier as defined in claim 1, wherein said doped core is non-polarization maintaining.

18. An optical amplifier as defined in claim 1, wherein said doped core is polarization maintaining.

19. An optical amplifier as claimed in claim 1, comprising at least three pump light sources each for producing a respective pump light having a respective power, each of said pump light sources being optically coupled to said optical fibre at a respective location therealong for guiding said pump lights into said inner cladding, said powers increasing with a distance between said locations at which said pump lights are coupled into said optical fibres and said signal coupler.

20. An optical assembly, said optical assembly being usable with an optical signal source producing an optical signal, a first pump light source producing a first pump light and a second pump light source producing a second pump light, said optical assembly comprising:
- an optical fibre, said optical fibre including a doped core, an inner cladding extending substantially radially outwardly from said doped core and an outer cladding extending substantially radially outwardly from said inner cladding;
- a signal coupler for optically coupling said signal light source to said doped core;
- a first pump coupler for optically coupling said first pump light source with said optical fibre so as to guide said first pump light into said inner cladding, said first pump coupler having a first coupler numerical aperture;
- a second pump coupler for optically coupling said second pump light source with said optical fibre so as to guide said second pump light into said inner cladding, said second pump coupler having a second coupler numerical aperture;
- wherein
  - said first pump coupler is located between said signal coupler and said second pump coupler; and
  - said second coupler numerical aperture is larger than said first coupler numerical aperture;
- whereby having said second coupler numerical aperture larger than said first coupler numerical aperture allows for the optical coupling of said second pump light into said optical fibre at a location at which said first pump light guided into said optical fibre by said first pump coupler has only been partially absorbed by said doped core.

21. An optical amplifier for amplifying an optical signal, said optical amplifier comprising:
- an optical fibre, said optical fibre having light amplification capabilities for amplifying said optical signal when illuminated by pump light;
- a signal coupler for receiving the optical signal and guiding the optical signal into the optical fibre;
- a first pump light source for producing a first pump light having a first power, said first pump light source being optically coupled to said optical fibre at a first location therealong for guiding said first pump light into said optical fibre at said first location; and
- a second pump light source for producing a second pump light having a second power, said second power being larger than said first power, said second pump light source being optically coupled to said optical fibre at a second location therealong for guiding said second pump light into the optical fibre at the second location;
- wherein said first location is located between said signal coupler and said second location; and wherein said signal coupler, said first pump light source and said second pump light source guide respectively said optical signal, said first pump light and said second pump light in said optical fibre in a manner such that said optical signal, said first pump light and said second pump light propagate substantially in the same direction in said optical fibre, said optical fibre extending uninterrupted between said first and second locations.

* * * * *